United States Patent [19]

McMinn et al.

[11] Patent Number: 5,727,177

[45] Date of Patent: Mar. 10, 1998

[54] REORDER BUFFER CIRCUIT ACCOMMODATING SPECIAL INSTRUCTIONS OPERATING ON ODD-WIDTH RESULTS

[75] Inventors: Brian D. McMinn, Buda; Robert D. Gowin, Jr., Austin, both of Tex.

[73] Assignee: Advanced Micro Devices, Inc., Sunnyvale, Calif.

[21] Appl. No.: 623,756

[22] Filed: Mar. 29, 1996

[51] Int. Cl.[6] .................................................. G06F 9/30
[52] U.S. Cl. ........................ 395/394; 395/393; 395/800
[58] Field of Search .................................. 395/390, 392, 395/393, 394, 800

[56] References Cited

U.S. PATENT DOCUMENTS

| | | | |
|---|---|---|---|
| 5,446,912 | 8/1995 | Colwell et al. | 395/393 |
| 5,548,776 | 8/1996 | Colwell et al. | 395/800 |
| 5,615,350 | 3/1997 | Hesson et al. | 395/394 |
| 5,615,402 | 3/1997 | Quattromani et al. | 395/800 |

OTHER PUBLICATIONS

Advanced Micro Devices, Inc., RISC Design–Made Easy Application Guide, 1992.
Advanced Micro Devices, Inc., Am29050 Microprocessor User+03 s Manual, 1991.
Mike Johnson, Superscalar Microprocessor Design, pp.127–146, Prentice Hall, Englewood Cliffs, New Jersey, 07632.

*Primary Examiner*—Parshotam S. Lall
*Assistant Examiner*—Viet Vu
*Attorney, Agent, or Firm*—Skjerven, Morrill, MacPherson, Franklin & Friel LLP; Ken J. Koester

[57] ABSTRACT

A superscalar processor provides register renaming using a reorder buffer includes special registers for handling predefined special instructions that operate on an odd-width data word. The superscalar processor includes a reorder buffer which stores result data having a predetermined standard bit-width. One or more instructions that generally occur only occasionally have a result data width that is substantially larger than the standard bit-width. The reorder buffer stores data of the standard bit-width and the occasional large bit-width in a storage that includes a plurality of standard-width storage elements in a first-in-first-out FIFO reorder buffer queue and a separate buffer that is specifically allocated for storing an extended result element. An extended result element includes a portion of a large bit-width result in excess of the standard bit-width result size.

22 Claims, 6 Drawing Sheets

140

| | DESTINATION TAG | VALUE | STATUS |
|---|---|---|---|
| RR0 | ‾‾ 311 | ‾‾ 301 | |
| RR1 | gr96  ‾‾312 | — 302 | in use |
| RR2 | gr97  ‾‾313 | — 303 | in use |
| RR3 | gr96  ‾‾314 | — 304 | in use |
| RR4 | ‾‾315 | ‾‾305 | |
| RR5 | ‾‾316 | ‾‾306 | |
| RR6 | ‾‾317 | ‾‾307 | |
| RR7 | ‾‾318 | ‾‾308 | |
| RR8 | ‾‾319 | ‾‾309 | |
| RR9 | ‾‾320 | ‾‾310 | |

↑ OLDER ENTRY

← SELECTED ENTRY

↓ NEWER ENTRY

FIG. 3

REORDER BUFFER CIRCUIT ACCOMMODATING SPECIAL INSTRUCTIONS OPERATING ON ODD-WIDTH RESULTS

BACKGROUND OF THE INVENTION

1. Field of the Invention

The invention relates to an execution core of a superscalar processor and to a reorder buffer for supplying operands to execution units within the superscalar processor. More specifically, the present invention relates to a reorder buffer within a superscalar microprocessor that includes handling of special instructions operating on odd-sized data.

2. Description of the Related Art

Processors generally process a single instruction in several steps. Early technology processors performed these steps serially. Advances in technology have led to pipelined-architecture processors, which may be called scalar processors, which perform different steps of many instructions concurrently. A "superscalar" processor is implemented using a pipelined structure, but further improves performance by supporting concurrent execution of scalar instructions.

In a superscalar processor, instruction conflicts and dependency conditions arise in which an issued instruction cannot be executed because necessary data or resources are not available. For example, an issued instruction cannot execute when its input operands are dependent upon data calculated by other instructions that have not yet completed execution. One method for handling data dependencies uses a buffer to temporarily hold information identifying operands for which data is unavailable. The buffer checks for data dependencies, by comparing input operands to all of the temporarily held operands.

Superscalar processor performance is improved by the speculative execution of instructions and by continuing to decode instructions regardless of the ability to execute instructions immediately. One technique for decoupling instruction execution from instruction decoding uses a buffer to temporarily hold information relating to instructions in a speculative state.

The buffer also improves the processor's performance of instruction sequences that include interspersed branch instructions. Branch instructions impair processor performance because instructions following the branch commonly must wait for a condition to become known before execution may proceed. A superscalar processor improves branching performance by "speculatively" issuing instructions, which involves predicting the outcome of a branch condition and proceeding with subsequent instructions in accordance with the prediction. The buffer is implemented to maintain the speculative state of the processor. When a misprediction occurs, the buffer is flushed.

In addition, various buffer implementations facilitate a processor's recovery from interrupts or traps arising from illegal instructions, preset trace operations, programmed stopping points, memory errors and other causes. The processor prepares for an interrupt or trap by storing manifestations of current conditions, processor state, and the address of the current instructions in the buffer. After completing a trap or interrupt routine, the processor returns to normal execution of the instruction stream, based on the stored data. Because interrupts and traps may occur at any point in an instruction sequence, the buffer must monitor the instruction stream to properly suspend and restart instruction execution.

One buffer, which may be called a recorder buffer, may furnish all of these functions. A reorder buffer is a storage that operates in the manner of a first-in-first-out (FIFO) queue. When an instruction is dispatched, an entry in the reorder buffer is allocated to hold the result generated by execution of the instruction. When execution of the instruction is completed, the result is placed in the allocated storage. Using a reorder buffer, instructions need not complete execution in the programmed order. The reorder buffer holds the results as the instructions are executed and places the results in the correct order before storing the results in a register file. In this manner, the reorder buffer allows for in-order issue of instructions, out-of-order execution, but in-order retiring of instructions.

A typical reorder buffer implementation allocates one entry for each instruction as the instructions are dispatched. This implementation is highly desirable if each operation generates a result that is encoded with the same fixed number of bits. For example, many processor utilize a 32-bit data path including a 32-bit reorder buffer and register file.

One family of processors is a 29K™ family that are produced by Advanced Micro Devices, Inc. of Santa Clara, Calif. In the 29000™ microprocessor architecture, the standard data path is a 32-bit pathway. However, several operations produce a result that is substantially larger than the 32-bit data path. The 29000™ microprocessor architecture has an instruction set that includes two instructions, including a JMPFDEC and a CALL instruction, that produce a result substantially larger than 32 bits in width.

JMPFDEC is a "jump false and decrement" instruction in which the contents of a general purpose register is monitored and, if the register shows a FALSE condition, a nonsequential instruction fetch is taken to an instruction address given by a TARGET operand of the instruction. Otherwise, when the general purpose register shows a TRUE condition, the JMPFDEC instruction does not affect the instruction execution sequence. The general purpose register is decremented by one in either case. The JMPFDEC instruction generates two 32-bit results, including the result of the decrement operation and the TARGET destination of the jump, if taken, or the subsequent sequential address if the jump is not taken.

CALL is a "call subroutine" instruction in which the address of a second following instruction is placed into a destination (DEST) location and a nonsequential instruction fetch occurs to the instruction address that is given by a TARGET operand. The instruction following the CALL is executed before the nonsequential fetch occurs. The CALL instruction also produces two 32-bit results, including the TARGET address of the call and the return address of the call.

What is needed is a technique and apparatus for handling generally infrequently occurring instructions that generate result data that is substantially larger than the typical data size.

SUMMARY OF THE INVENTION

In accordance with the present invention, a superscalar processor that provides register renaming using a reorder buffer includes special registers for handling predefined special instructions that operate on an odd-width data word.

In accordance with the present invention, a superscalar processor includes a reorder buffer which stores result data having a predetermined standard bit-width. One or more instructions that generally occur only occasionally have a result data width that is substantially larger than the standard bit-width. The reorder buffer stores data of the standard bit-width and the occasional large bit-width in a storage that includes a plurality of standard-width storage elements in a first-in-first-out FIFO reorder buffer queue and a separate buffer that is specifically allocated for storing an extended result element. An extended result element includes a portion of a large bit-width result in excess of the standard bit-width result size.

In accordance with one embodiment of the present invention, a processor executes instructions from an instruction set which includes both a plurality of first instruction type instructions that generate a result having a standard bit-width size and a second instruction type instruction that generates a result having a large bit-width size, the large bit-width size being larger than the standard bit-width size. The processor includes an instruction supply for supplying instructions of the first type and instructions of the second type, a plurality of execution units connected to the instruction supply for receiving the supplied instructions, executing the received instructions, and generating results of the executed instructions. The results are results of the standard bit-width size and results of the large bit-width size. The processor further includes a reorder buffer connected to the instruction supply for allocating storage for the supplied instructions and connected to the execution units to receive and store the results of the executed instructions. The reorder buffer includes a plurality of storage elements in a FIFO reorder buffer queue for storing results of the standard bit-width size and for storing a subset of bits of the result of the large bit-width size and an extended buffer for storing a subset of bits of the result of the large bit-width size in excess of the standard bit-width size.

The described invention achieves numerous advantages. One advantage is that handling of extended bit-width results in this manner imposes only a small burden in hardware resources. In fact, alternative techniques for handling extended bit-width results impose a substantially greater burden on hardware resources so that the described invention reduces integrated circuit size and complexity.

Another advantage is that the handling of extended bit-width data using the described technique only minimally impacts processor speed. In fact, alternative techniques for handling extended bit-width results impose a substantially greater burden on the latency of reorder buffer operations so that the described invention provides a substantially improved processor performance.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 3 is a diagram which illustrates the storage format of the reorder buffer including storage for a plurality of registers and supporting tag information elements.

DETAILED DESCRIPTION OF THE PREFERRED EMBODIMENTS

One technique for handling two 32-bit results, when the reorder buffer has a capacity for holding only a single 32-bit result, is to allocate two reorder buffer entries to each of the CALL and JMPFDEC instructions. Hardware that is activated by the CALL and JMPFDEC instructions performs a special-case "current address plus 2" calculation to address a subsequent instruction. Unfortunately, a processor operates at a high speed and the technique of utilizing two reorder buffer entries for a single instruction may cause a speed problem in which the reorder buffer addressing circuitry may not increment the reorder buffer address sufficiently quickly following the special-case instructions. In one implementation of a reorder buffer, the allocation of two reorder buffers was not consistently successful because reorder buffer entries subsequent to the special case (CALL and JMPFDEC) instructions were not addressed sufficiently quickly to avoid timing errors.

An alternative technique for handling the special-case CALL and JMPFDEC instructions is to temporarily pause or halt dispatching of instructions each time the CALL and JMPFDEC instructions are encountered. This technique was useful but resulted in a substantial reduction in processor performance.

A further alternative technique for handling occasional increased bit-width instructions is to increase the size of all reorder buffer entries so that the full width of the special-case instruction result, for example 64 bits, is stored in each reorder buffer entry. Unfortunately, this solution is expensive in terms of wasted integrated circuit space and hardware overhead.

Figure 1:
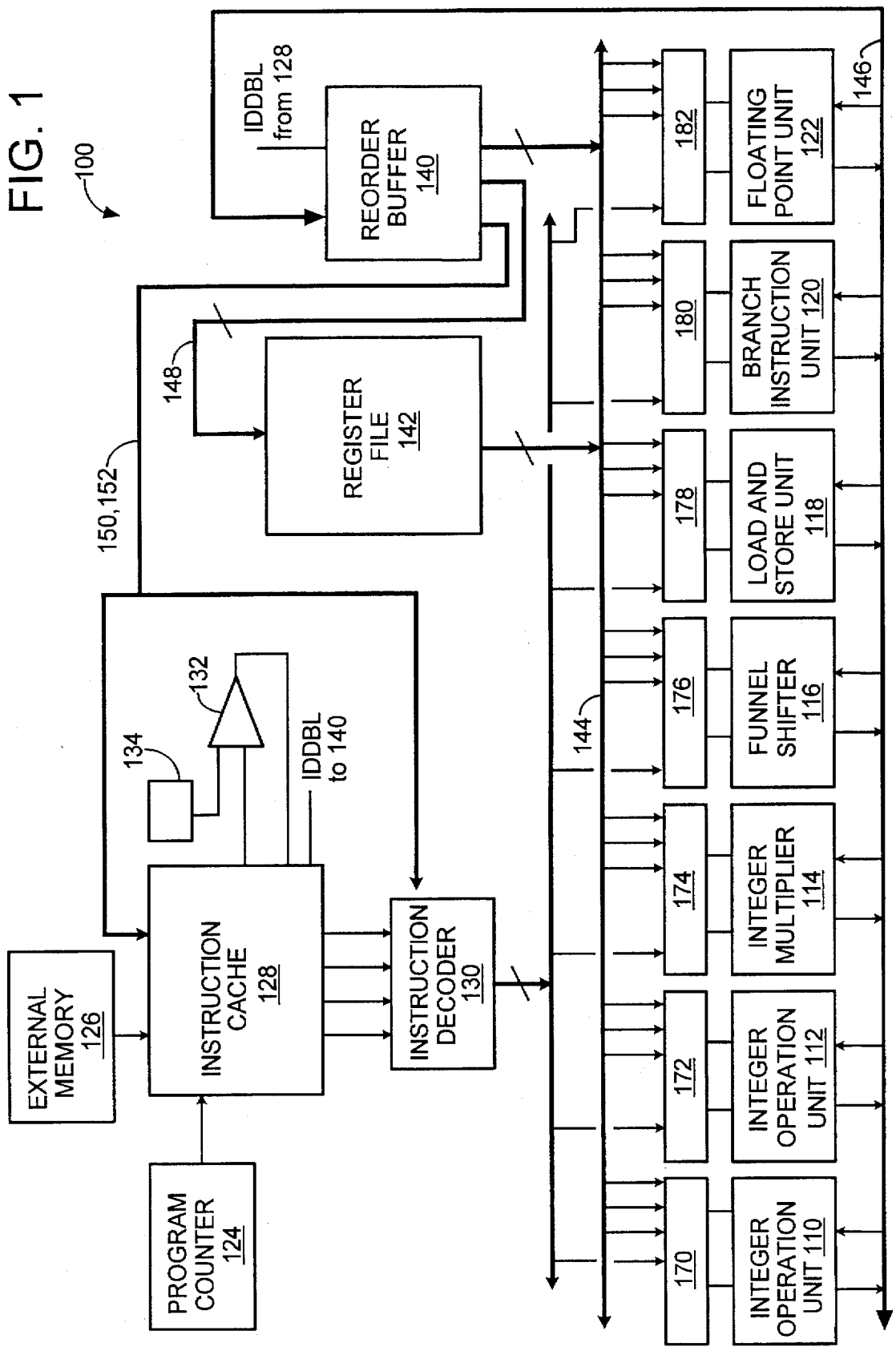
FIG. 1 is a schematic block diagram illustrating a superscalar processor in accordance with one embodiment of the present invention.

Referring to FIG. 1, a superscalar processor 100 achieves higher performance than a conventional scalar processor by executing multiple instructions per cycle in parallel on a plurality of execution units. The plurality of execution units include, for example, two integer operation units 110 and 112, an integer multiplier 114, a funnel shifter 116, a load and store unit 118 and a branch instruction unit 120. Some embodiments of the superscalar processor 100, the execution units also include a floating point functional unit 122. In one embodiment, the two integer operation units 110 and 112, the integer multiplier 114, the funnel shifter 116, the load and store unit 118 and the branch instruction unit 120 operate on 32-bit data operands and furnish a 32-bit result with all operations performed in a single cycle.

Higher speed operation performance is achieved when the greatest number of execution units are kept productively busy during the same processor cycles. Execution units are kept busy through the operation of an instruction decoder 130 to steadily supply instructions and by a reorder buffer 140 and a register file 142, which supply operand data for execution over a plurality of operand buses 144, for example eight operand buses 144. The instruction decoder 130 receives instructions from an external memory 126 through an instruction cache 128. A program counter 124 is connected to the instruction cache 128 and contains the address of an instruction currently being fetched and the address of the next sequential instruction to be fetched. The instruction cache 128 contains logic, such as a comparator 132, that determines whether a particular instruction, for example a CALL or JMPFDEC instruction, designated by an instruction code store 134 is to be dispatched.

Operand data is supplied from the reorder buffer 140 from a temporary register that corresponds to the most-recently evaluated copy of the appropriate destination register. If no reorder buffer entries correspond to the destination register, operand data is supplied from the register file 142.

Results of the execution of instructions are passed from the execution units to the reorder buffer 140 over a plurality of result buses 146, for example two result buses 146. Most result buses 146 are generally available for communicating results from any execution unit to the reorder buffer 140, although some result buses may be allocated for special usage. For example, an XRES2B result bus of the result buses 146 is dedicated for communicating branch targets from the branch instruction unit 120 to the reorder buffer 140. Result values are tagged to designate which register of the register file 142 a data result is to be written. The register file 142 includes a plurality of registers. In one embodiment, the register file 142 contains 192 general-purpose registers which are accessible using four-port access allowing two 64-bit source operands to be fetched in one cycle. Registers are storage elements that are used to hold data values. Results are written from the reorder buffer 140 to the register file 142 via a retirement bus 148. Program control information is communicated from the reorder buffer 140 to instruction control circuits such as the program counter 124 and the instruction cache 128 via writeback buses 150. For example, a program address is communicated from the reorder buffer 140 to the program counter 124 via an XWR2B bus of the writeback buses 150. In addition, status information is communicated from the reorder buffer 140 to the instruction decoder 130 via a plurality of reorder buffer status lines 152, for example four lines.

The passing of an instruction from the instruction decoder 130 to an execution unit is called "issue" or "dispatch" of an instruction. The instruction decoder 130 issues a plurality of instructions, for example four instructions, "in-order" and in parallel. Some instructions take longer to execute so that completion of execution is "out-of-order". For example, load and store instructions are typically allowed to execute in parallel with other instructions but are unable to complete immediately and complete after a delay of a few cycles. Instructions following load and store instructions are issued and execute in parallel unless a data dependency occurs. A data dependency arises, for example, when a load instruction is followed by an operation on the loaded data.

The superscalar processor 100 reduces total execution time for an instruction sequence by allowing all instructions to complete out-of-order so that issue of an instruction is not delayed after an instruction is issued to an execution unit which executes in a plurality of clock cycles. Consequently, execution units with a long latency may complete execution after a subsequently issued instruction that is issued to a low latency execution unit. For example, long latency floating point operations are executed in parallel with short duration integer operations. The superscalar processor 100 includes a plurality of retirement buses 148 which communicate data from the reorder buffer 140 to the register file 142. In a typical software program, most instructions are issued to an integer operation unit of units 110 and 112 which have a latency of only one cycle.

Even though the superscalar processor 100 supports out-of-order instruction completion, data dependencies still occur that flow through the execution of a software program. These data dependencies represent the movement of operands between instructions in the program. For example, the following code results in a flow dependency:

| mul | gr96, lr2, lr5 | ;write gr96, gr96=lr2 * lr5 |
| add | gr97, gr96, 1 | ;read gr96, write-read dependency. |

The result, a multiplication product, is written to register gr96. The second instruction (add) is issued to a different integer unit 110, for example. However, the second instruction (add) has a source operand supplied in register gr96. If the second instruction had no data dependencies on the first instruction (mul), the second instruction could issue while the first instruction was still executing. However, the execution of the first instruction must complete before the second instruction can start execution. Thus, a dependency condition exists. This type of dependency is called a write-read dependency because register gr96 must be written by an earlier instruction before the later instruction can read the result.

The superscalar processor 100 uses a technique called "register renaming" to handle this type of dependency.

A second type of dependency, called a "write-write" dependency, is described with reference to a second software program code example:

| mul | gr96, lr2, lr5 | ;write gr96, gr96=lr2 * lr5 |
| add | gr97, gr96, 1 | |
| add | gr96, lr5, 1 | ;write gr96, write-write dependency |

The result of the third instruction has an output dependency on the first instruction. Thus, the third cannot complete before the first instruction completes. Both instructions write the result to register gr96. Completion of the first instruction (mul) after completion of the second (add) and third (add) instructions would result in holding of an out-of-date value in register gr96. Because completion of multiple instructions is dependent on writing gr96 with the correct value, the dependency is called a write-write dependency. Parallel instruction execution that is enabled by out-of-order completion enables an improved performance as compared to in-order completion, but extra logic is used to deal with data dependency checking. With in-order instruction issue, additional instructions are not issued while the write-write dependency is in force. To enable instruction issue to continue when data dependencies are present, the architecture of the superscalar processor 100 is complicated but the ensuing performance reward is extended beyond the performance of simple out-of-order completion with in-order issue.

Instruction issue continues even during write-read and write-write dependencies. When a data dependency is detected, the instruction subject to the data dependency is stalled and is not allowed to issue. However, subsequent instructions are still issued by decoding instructions, then holding the instructions in an "instruction window" in the form of a reservation station that is associated with each of the execution units. For example, the execution units corresponding to the two integer operation units 110 and 112, the integer multiplier 114, the funnel shifter 116, the load and store unit 118, the branch instruction unit 110 and the floating point functional unit 122 are respectively associated with reservation stations 170, 172, 174, 176, 178, 180 and 182. When the data dependency is resolved and an appropriate execution unit is available, instructions are then activated through the operation of the reservation station. Thus, the reservation station separates the processes of decoding and executing an instruction.

Specifically, the instruction decoder 130 sends an instruction and any available operands during a decode clock cycle to a suitable selected execution unit. If a dependency condition exists relating to the instruction, the instruction is held in the reservation station until all dependencies relating to the held instruction are resolved and the execution unit is available for execution of the instruction. An instruction is issued from the reservation station when operands operated upon by the instruction are available for execution. Subsequently issued instructions occasionally are issued from the reservation stations ahead of earlier instructions which become blocked due to data dependency conditions. A type of data dependency called an "antidependency" arises as a result of a capability to execute instructions out-of-order. An antidependency condition is described with respect to a third software program code example:

| mul | gr96, lr2, lr5 | ;gr96=lr2 * lr5 |
| add | gr97, gr96, 1 | ;read gr96 |
| add | gr96, lr5, 1 | ;write gr96, read-write dependency |

The third instruction (add gr96) stores the result of the add operation in register gr96. The second instruction (add gr97) receives an operand in the same gr96 register. The third instruction (add gr96) cannot complete and write a result until the second instruction (add gr97) begins execution. Otherwise, the second instruction (add gr97) receives the wrong operand. Thus, the result of the third instruction has an antidependency on the second instruction. The antidependency is similar to an in-order issue dependency, but is reversed. The antidependency is also called a read-write dependency because register gr96 must be read be the second instruction before the third instruction can write a result to register gr96.

The flow of data through a software program is represented by the registers accessed by instructions. When instructions execute out-of-order, the flow of data between instructions is restricted by the reuse of registers to hold different data values.

The superscalar processor 100 overcomes the problems of antidependency (read-write), write-write and write-read dependency conditions by the technique of register renaming, which is implemented by the reorder buffer 140. The reorder buffer 140 essentially renames temporary registers for the duration of a data flow so that multiple copies of a register may exist. The temporary registers operate in the role of registers indicated by the instruction sequence. The reorder buffer 140 tags these registers to specify which register is renamed.

Figure 2:
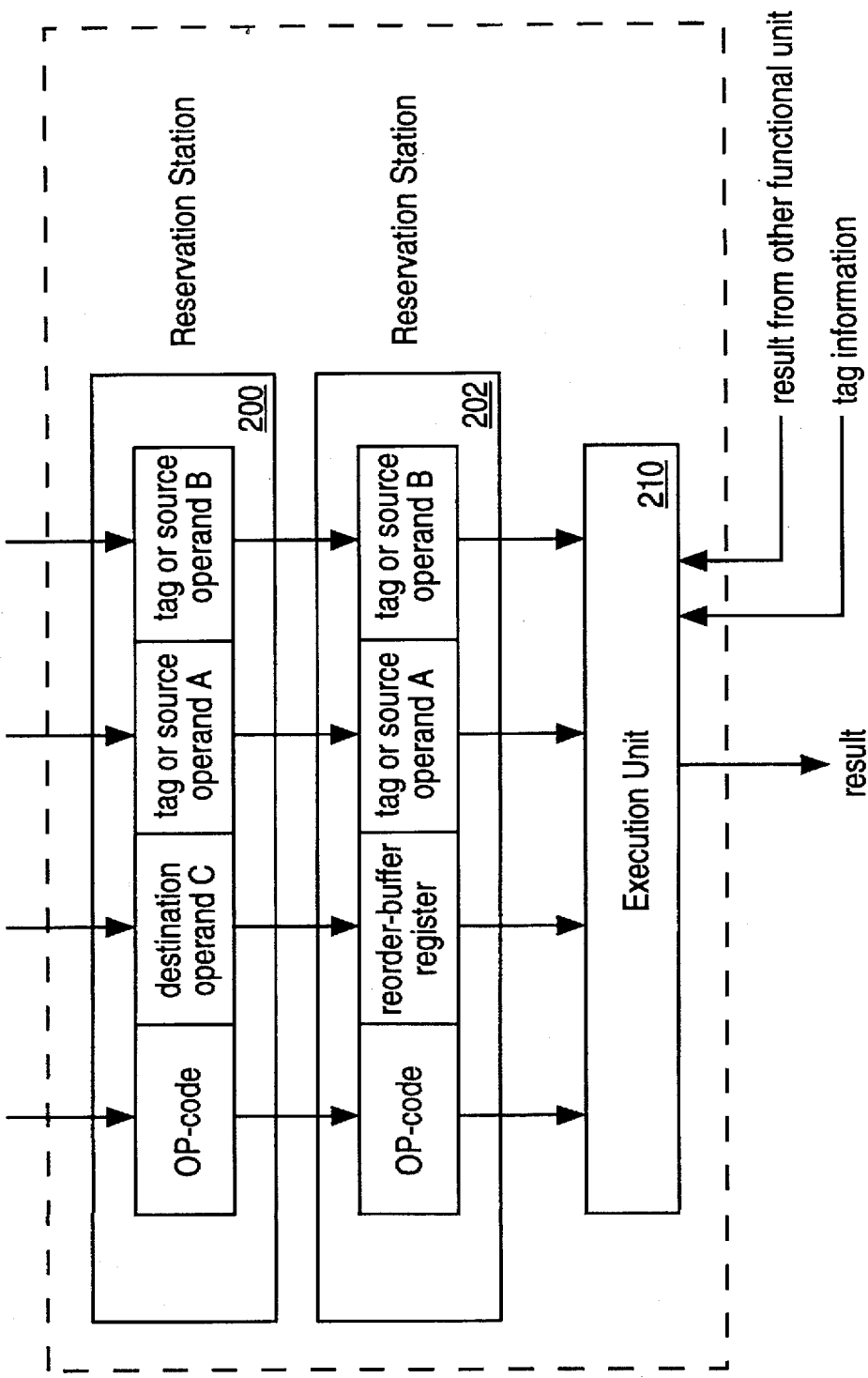
FIG. 2, is a schematic block diagram showing connections between a reservation station and an execution unit.

Referring to FIG. 2, a two reservation stations 200 and 202 are shown which are connected to an execution unit 210. Each execution unit 210 includes one or more reservation stations 200 and 202 which hold instructions and operands awaiting execution. The reservation stations represent the instruction window from which instructions are issued. The instruction decoder 130 places instructions into reservation stations with copies of operands, when the operands are available. If the operands are not available, instruction decoder 130 places tags that indicate the register supplying missing data into the reservation stations. The reservation station, by holding a copy of a source operand, prevents the operand from being updated by a future instruction, thereby eliminating antidependency conflicts. The execution unit 210 issues instructions to execute circuitry of the unit (not shown) when the execute circuitry becomes idle and the reservation station 200 or 202 has an instruction ready for execution. Once an instruction is placed in the reservation station 200 or 202, issue of the instruction subsequently occurs without regard of any instruction issue that takes place in another execution unit. A variable number of reservation stations may be attached to an execution unit. The greater number of reservation stations attached to an execution unit, the larger the instruction window, the further into the future the superscalar processor 100 can decode and issue instructions and the more decoder stalling due to high short-term demands is prevented.

An instruction becomes stalled in a reservation station when a data dependency causes a tag, rather than data, to be placed in an operand field of the reservation station. Data that satisfies a data dependency condition becomes available upon completion of another instruction, in the same execution unit or another execution unit, and a result of the instruction becomes available. Results are written via the result buses 146 to the reorder buffer 140 to set the value of a temporary register which corresponds to a destination register within the register file 142. The temporary registers in the reorder buffer 140 are tagged to specify a destination register in the register file 142 to which the temporary register corresponds.

When an execution unit completes execution of an instruction, the execution unit places the result and a tag identifying the destination register on the result buses 146. When several execution units complete instruction execution in the same cycle, the execution units compete for available result buses 146. The execution units monitor the result buses 146 to determine whether a result that satisfies a data dependency of an instruction held within a reservation station is available so that results are forwarded directly from the result buses 146 to the execution units without passing through the reorder buffer 140 or register file 142.

Once an instruction is placed in a reservation station, the instruction executes in sequence with other instructions held in other reservation stations 200 and 202 within the same execution unit 210. However, exceptional events, such as exceptions or traps, or the placing of instructions into the reservation stations 200 or 202 as a result of a mispredicted speculative execution diverts the planned execution order.

Referring to FIG. 3, the format of the reorder buffer 140 illustrates a storage for ten registers 301 through 310 and respective supporting tag information elements 311 through 320. Every new result value is allocated a new copy of the destination register. Copies of the destination register are tagged to enable usage of the copies as source operands in subsequent instructions. Register renaming is illustrated in a software program code example:

| original code | | code after register renaming | | |
|---|---|---|---|---|
| mul | gr96, lr2, lr5 | mul | RR1, lr2, lr5 | ;gr96=lr2 * lr5 |
| add | gr97, gr96, 1 | add | RR2, RR1, 1 | |
| add | gr96, lr5, 1 | add | RR3, lr5, 1 | |

In this example, a write-write dependency between the first instruction (mul) and the third instruction (add gr96) and a read-write dependency between the second and third instructions are resolved by renaming register gr96 to temporary register RR3 in the third instruction. In this manner, execution of the third instruction is not necessarily stalled due to a register dependency.

Figure 4:
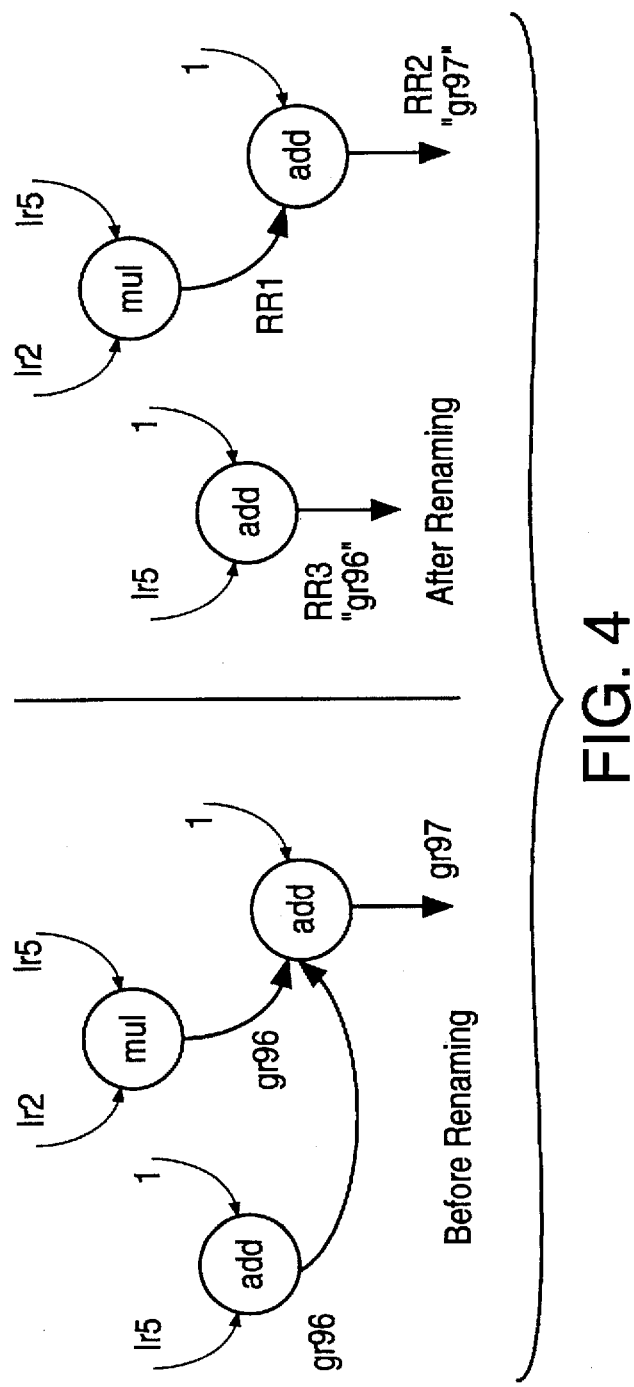
FIG. 4 is a schematic block diagram showing data dependencies with and without register renaming.

Referring to FIG. 4, a block diagram illustrates the dependencies with and without register renaming. As an instruction is decoded by the instruction decoder 130, and placed in a reservation station, a register in the reorder buffer 140 is assigned to hold the instruction result. FIG. 3 illustrates the format of information held in the reorder buffer 140. When the instruction is issued from the reservation station and, at a later time, execution is completed, the result is written to the assigned reorder buffer entry.

If a subsequent instruction refers to the result of a previous instruction, the reorder buffer 140 is accessed via the contents of a destination-tag field 311 through 320 in the reorder buffer 140 in an operation termed "content-addressable memory access". A parallel search of the multiple elements in the reorder buffer 140 is performed as multiple memory locations are simultaneously examined to determine if the requested data is held in the elements. If the instruction which produces a result has not yet completed execution, the dispatched instruction is furnished a reorder buffer tag that designates the pending data.

Often the reorder buffer 140 contains multiple entries which are tagged to correspond to the same result register. When the reorder buffer 140 is accessed with a destination tag which has multiple entries, the reorder buffer 140 supplies data relating to the most recently issued instruction.

When the reorder buffer entry is updated with the result value, the reorder buffer entry is ready to be retired. A result is retired when the result is written to the register file 142 via the retirement buses 148. Two retirement buses 148 are supplied in the described embodiment to limit the number of instructions that can be retired in one processor cycle to four, including two instructions which modify registers, one store instruction and one branch instruction. When the reorder buffer 140 is filled, no further instruction decoding occurs until entries within the reorder buffer 140 are made available by instruction retiring. Instructions are retired in the order of issue.

Highly efficient operation of the superscalar processor 100 is achieved when the reservation stations are fully utilized and the instruction decoder 130 proceeds at a rate equal to or greater than the rate of instruction execution. Highly efficient operation is sought using a technique of speculative execution, in which the branching operation of the processor 100 is predicted. A branch prediction operation is performed, in cooperation, in the instruction decoder 130 and the branch instruction unit 120. The instruction decoder 130 does not wait for the outcome of a branch instruction to be known before fetching a new instruction stream. Rather, the instruction decoder 130 examines an instruction that is currently decoded, and determines if a branch is present. When a branch instruction is found, the instruction decoder 130 predicts whether the branch will be taken and the target of the branch. In this manner, instructions are fetched and decoded along the predicted instruction path.

Branch prediction supports speculative execution fetching and results in instructions being placed in the reservation stations for speculative dispatch and execution. When a branch is mispredicted, instructions in the reservation stations that fall in the mispredicted branch are canceled. An instruction is canceled when a branch instruction is mispredicted. Cancellation of the instruction is achieved by removing the instruction from the reorder buffer 140.

Branch prediction is implemented using a branch target cache memory (not shown) which incorporates a 64- or 128-entry memory to supply instructions for a branch, if the particular branch was previously predicted, while a new prefetch stream is established.

Figure 5:
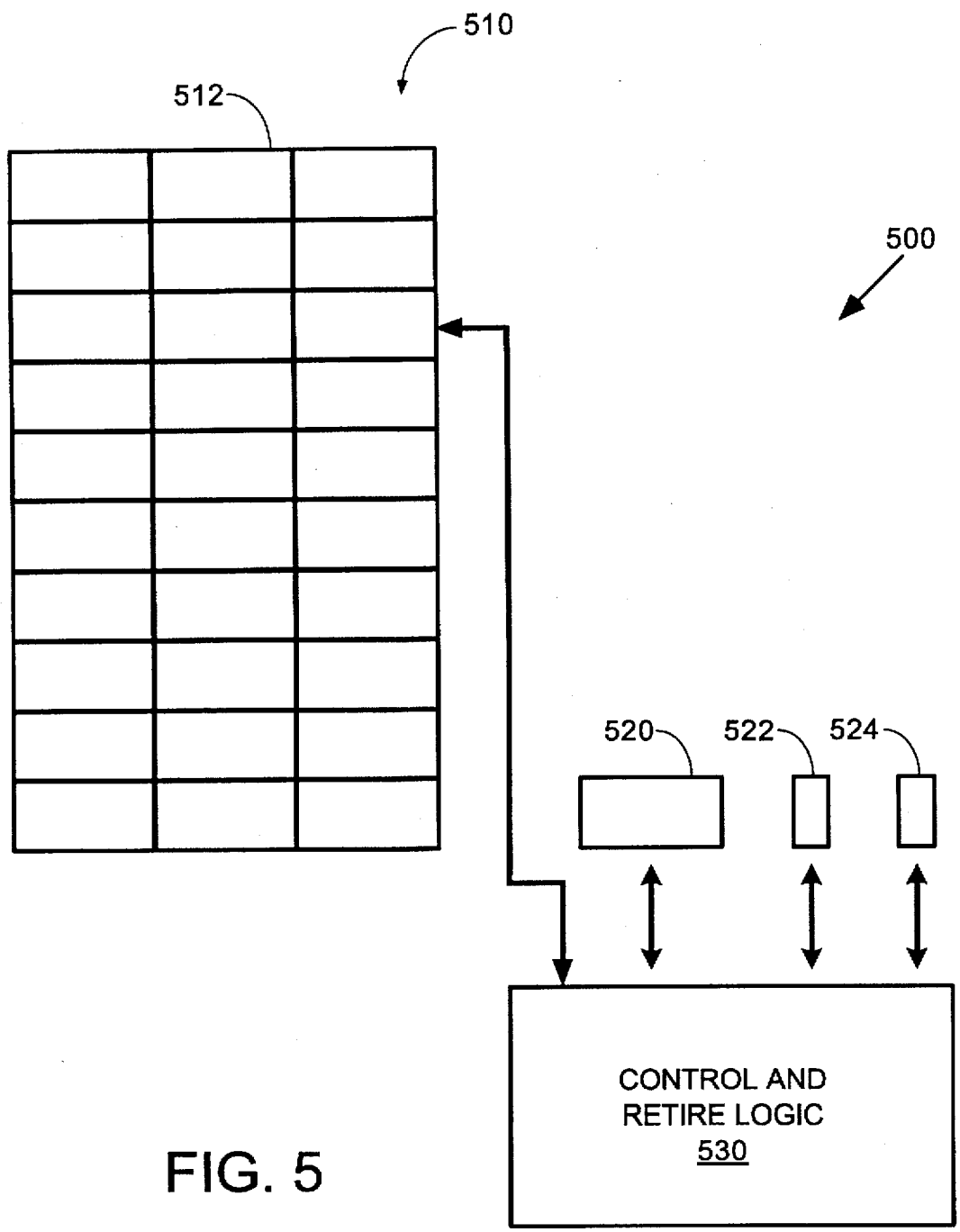
FIG. 5 is a schematic block diagram illustrating a reorder buffer that implements an extended buffer.

Referring to FIG. 5, a schematic block diagram of a reorder buffer 500 that implements an extended buffer 520 is shown. The reorder buffer 500 stores result data having a predetermined standard bit-width of, for example, 32 bits. One or more instructions, for example a CALL instruction and a JMPFDEC instruction, generally occur only occasionally and have a result data width, for example 64 bits, that is substantially larger than the standard bit-width of 32 bits. The reorder buffer 500 stores data of the standard bit-width and the occasional large bit-width in a storage 510 that includes a plurality of standard-width 32-bit storage elements in a first-in-first-out FIFO reorder buffer queue 512 and a separate extended buffer 520 that is specifically allocated for storing an extended result element. In the described embodiment, the FIFO reorder buffer queue 512 includes ten storage elements and control and retire logic 530. An extended result element includes a portion of a large bit-width (64 bit) result in excess of the standard bit-width result size (32 bit).

The described embodiment includes only a single extended buffer 520, imposing a constraint that only a single CALL or JMPFDEC instruction can be in issue at one time. This constraint is enforced by the instruction decoder 130 shown in FIG. 1. This constraint has only a minimal impact on processor performance since the CALL and JMPFDEC instructions are rarely positioned in close proximity in a software program. Furthermore, CALL and JMPFDEC instructions are rarely positioned consecutively due to the nature of the instructions. In addition, a reorder buffer is rarely filled during execution, for example five to eight instructions are typically held in a ten-entry reorder buffer at any time, so that attempted dispatch of multiple CALL and JMPFDEC instructions into a reorder buffer are very rare.

In other embodiments, additional instructions may generate an extended result or instructions that generate extended results may occur more frequently so that one or more additional extended buffers may be included in a reorder buffer.

The extended buffer 520 is dedicated to a single purpose of holding a branch target address for a CALL or JMPFDEC instruction. In one embodiment, the extended buffer 520 is a 32-bit latch that receives branch target data from the branch instruction unit 120 via the XRES2B result bus of the result buses 146, upon completion of execution of a branch instruction. The extended buffer 520 holds the branch target result data until the branch instruction is either retired or canceled. When the branch instruction is retired, the branch target data is communicated to the program counter 124 via the XWR2B bus of the writeback buses 150 to convey a jump target result.

The extended buffer 520 has a simplified form in comparison to the ten storage elements of the FIFO reorder buffer queue 512. Specifically, dependency checking is not relevant to the target stored in the extended buffer 520 so that dependency-checking logic is not necessary. Furthermore, the storage elements of the FIFO reorder buffer queue 512 accept data from any of the three result buses 146 and send operand data to any of the eight operand buses 144, the two retirement buses 148 and the program count (PC) writeback bus 150. The extended buffer 120, in contrast, does not include the two retirement bus 148 connections since branch target results are not written to the register file 142. The extended buffer 120 is not connected to the operand buses 144 and does not include logic for determining which buffer entry to forward because a branch target result is not an operand datum.

The extended buffer 520 includes a double pending bit 522 and a double valid bit 524. The double pending bit 522 is a set/reset latch that is furnished to control operations of the extended buffer 520. The double pending bit 522 is set when a CALL or JMPFDEC instruction, also referred to as a "double instruction", is dispatched. The double pending bit 522 is reset when the double instruction is retired or canceled. The double valid bit 524 is furnished to indicate that the extended buffer 520 contains valid data. When a double result is returned from the branch instruction unit 120, the double valid bit 524 is set.

Figure 6:
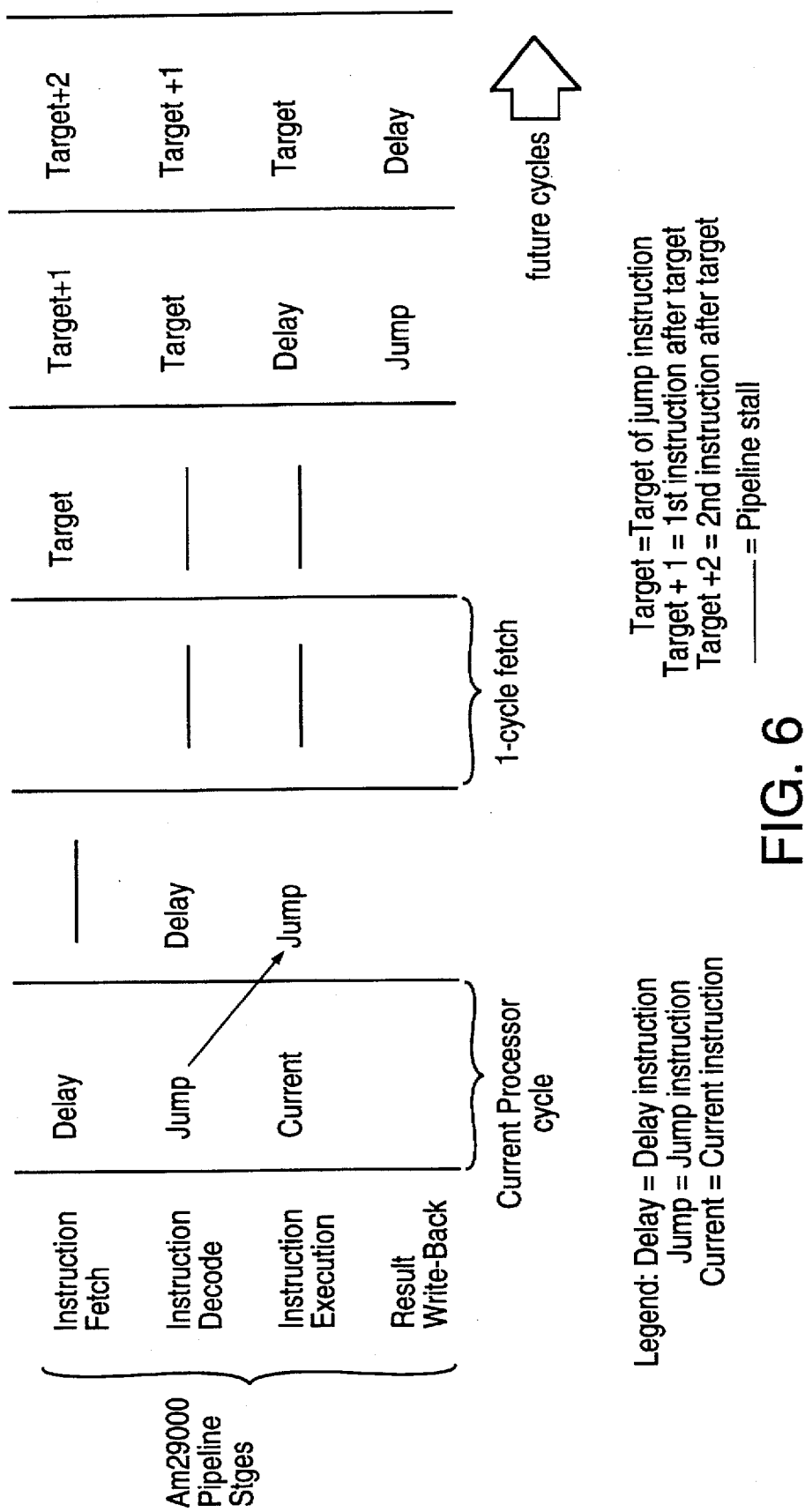
FIG. 6 is a timing diagram that shows timing steps of handling and execution of a double instruction.

The superscalar processor 100 shown in FIG. 1 operates as a four stage pipeline. A timing diagram for a sequential execution pipeline is shown in FIG. 6, which is described in conjunction with FIGS. 1 and 5, during handling and execution of a double instruction. The first pipeline stage is an instruction fetch stage, during which the instruction cache 128 fetches instructions as directed by the program counter 124. The second stage is an instruction decode stage when instructions are decoded and dispatched by the instruction decoder 130. The third stage is an instruction execution stage when the execution units execute instructions. During a fourth stage, a result write-back stage, instructions are retired and results are written from the reorder buffer 140 to the register file 142 and a count may be written from the reorder buffer 140 to the program counter 124.

During a PH1 phase of the instruction decode stage, the instruction cache 128 detects CALL and JMPFDEC instructions as the instructions are fetched. When a CALL or JMPFDEC instruction is detected, the instruction cache 128 sends a signal on an instruction decode double line IDDBL to the reorder buffer 140 in notification that a double instruction is to be dispatched. If the double pending bit 522 is already set, the reorder buffer 540 sends a signal to the instruction decoder 130 via the reorder buffer status lines 152 which indicates that immediate dispatch of the double instruction is prohibited. The instruction decoder 130, in response to this prohibition, only issues instructions up to, but not including, the double instruction, thereby stalling the instruction decoder 130 until the pending double instruction is either retired or canceled.

Otherwise, the double pending bit 522 is not set and the reorder buffer 140 sends a signal notifying of this status via the reorder buffer status lines 152. The instruction decoder 130 responds in the next PH1 phase by dispatching all instructions applied to the instruction decoder 130, including the double instruction, causing the reorder buffer 140 to set the double pending bit 522.

Usage of the extended buffer 520 to handle a large bit-width result is highly advantageous in comparison to the alternative technique of allocating two reorder buffer entries to each of the double instructions. For example during the decode stage, filling of the reorder buffer 140 is performed sequentially. A destination tag for an entry into the reorder buffer 140 is calculated based on the instruction valid and double instruction status of the previous instruction in the reorder buffer 140. This calculation is a sequential operation so that the destination tag for a first instruction dispatched to the reorder buffer 140 is calculated from status bits of the previous instruction alone. However, calculation of the destination tag for each subsequent instruction requires calculation of the destination tag for each previous instruction plus a calculation based on the status bits of the previous instruction. In addition, the type of instruction to be dispatched, whether a single or double instruction, is necessarily known before the calculation is made, interjecting an additional delay into reorder buffer timing.

In contrast, the disclosed technique which uses the extended buffer 520 to store the large bit-width result so that all destination tags are consecutive and quickly computed without delay. Accordingly, the disclosed technique which uses the extended buffer 520 does not suffer from extended latency.

Instructions are executed by execution units during the execution stage of the pipeline. The execution units generate result data and apply the result data to the result buses 146 during the execution stage. All execution units, including the branch instruction unit 120, return a result tag in combination with result data to the reorder buffer 140 via the result buses 146. The result tag designates the storage element of the FIFO reorder buffer queue 512 into which the result of the result-result tag combination is to be stored. The reorder buffer 140 uses the result tag for directing the combined result into an appropriate storage element.

Usage of the extended buffer 520 to handle a large bit-width result is highly advantageous in comparison to the alternative technique of allocating two reorder buffer entries to each of the double instructions. For either technique during the execute stage, the branch instruction unit 120 produces two result tags for a double instruction, including a result tag like the result tags that are generated for a single instruction and a result tag that is unique to double instructions and tags the branch target result. However, the branch target result tag for double instructions is set equal to the destination tag plus one for the alternative technique, so that some calculation is necessary to generate the branch target result tag. In contrast, in the disclosed reorder buffer 140 which includes the extended buffer 520, the branch instruction unit 120 sets the branch target result tag to a hard-coded pointer to the extended buffer 520 so that calculation is advantageously avoided.

Results are retired by the reorder buffer 140 during the retire stage of the pipeline. When a double instruction becomes the oldest valid but not-yet-retired instruction in the reorder buffer 140, the reorder buffer 140 checks the state of the double valid bit 524. If the double valid bit 524 is set, the double instruction is retired during a PH2 phase. If the double valid bit 524 is not set, retirement of all instructions is stalled until the branch instruction unit 120 returns a valid result.

When the double instruction is retired, the reorder buffer 140 sends the branch target from the extended buffer 520 to the program counter 124 via the XWR2B bus of the write-back buses 150. The reorder buffer 140 then clears the double pending bit 522.

While the invention has been described with reference to various embodiments, it will be understood that these embodiments are illustrative and that the scope of the invention is not limited to them. Many variations, modifications, additions and improvements of the embodiments described are possible. For example, the large and standard bit-width sizes are not necessarily 32 bits and 64 bits, respectively but may be any bit width sizes. Furthermore, the large bit-width size is not necessarily twice the size of the standard bit-width size but may be any size larger than the standard bit-width size.

What is claimed is:

1. A processor for executing instructions from an instruction set including a plurality of first instruction type instructions that generate a result having a standard bit-width size and a second instruction type instruction that generates a result having a large bit-width size, the large bit-width size being larger than the standard bit-width size, the processor comprising:

an instruction supply for supplying instructions of the first type and instructions of the second type;

a plurality of execution units coupled to the instruction supply for receiving the supplied instructions, executing the received instructions, and generating results of the executed instructions, the results being results of the standard bit-width size and results of the large bit-width size; and a reorder buffer coupled to the instruction supply for allocating storage for the supplied instructions and coupled to the execution units to receive and store the results of the executed instructions, the reorder buffer including:
- a plurality of storage elements in a FIFO reorder buffer queue for storing results of the standard bit-width size and for storing a subset of bits of the result of the large bit-width size; and
- an extended buffer for storing a subset of bits of the result of the large bit-width size in excess of the standard bit-width size.

2. A processor according to claim 1 wherein:

the instruction supply further includes logic for monitoring the supplied instructions and designating an instruction type of the supplied instructions.

3. A processor according to claim 2 wherein:

the reorder buffer is coupled to the instruction supply to receive the designated instruction type, the reorder buffer further including:

a status bit for designating whether the reorder buffer has allocated storage in the extended buffer for an instruction of the second type; and logic for determining whether an instruction of the second type is already allocated when the instruction supply is supplying a designated instruction of the second type.

4. A processor according to claim 3 further comprising:

a status line coupling the reorder buffer to the instruction supply, the status line for informing the instruction supply that an instruction of the second type is already allocated when the instruction supply is supplying a designated instruction of the second type, the instruction supply further including:
- a control circuit for stalling the instruction supply responsive to an informing signal of the status line.

5. A processor according to claim 4 further comprising:

an execution unit for executing instructions of the second type, the execution unit for generating a result and valid signal indicative of a valid result of an instruction of the second type;

the reorder buffer further including:
- a valid status bit for designating whether the reorder buffer has a valid result of an instruction of the second type in the allocated storage in the extended buffer.

6. A processor according to claim 5 further comprising:

a valid status line coupling the reorder buffer to the instruction supply, the status line for informing the instruction supply that the extended buffer holds a valid result of an instruction of the second type, the instruction supply further including:
- a control circuit for activating the instruction supply responsive to an informing signal of the valid status line.

7. A processor according to claim 1 wherein:

the large bit-width size is 64 bits; and
the standard bit-width size is 32 bits.

8. A processor according to claim 1 wherein:

an execution unit of the plurality of execution units is a branch instruction unit;

a CALL instruction is an instruction of the second instruction type that is executed by the branch instruction unit and that generates a result having a large bit-width size, the bits of the large bit-width size in excess of the standard bit-width size being a branch target designation.

9. A processor according to claim 1 wherein:

an execution unit of the plurality of execution units is a branch instruction unit;

a JMPFDEC instruction is an instruction of the second instruction type that is executed by the branch instruction unit and that generates a result having a large bit-width size, the bits of the large bit-width size in excess of the standard bit-width size being a branch target designation.

10. A method of operating a processor comprising the steps of:

supplying instructions from an instruction set including a plurality of first instruction type instructions that generate a result having a standard bit-width size and a second instruction type instruction that generates a result having a large bit-width size, the large bit-width size being larger than the standard bit-width size;

executing the supplied instructions;

generating results of the executed instructions, the results being results of the standard bit-width size and results of the large bit-width size;

allocating storage for the supplied instructions;

receiving results of the executed instructions;

storing results of the standard bit-width size and for storing a subset of bits of the result of the large bit-width size in a plurality of storage elements in a FIFO reorder buffer queue; and storing a subset of bits of the result of the large bit-width size in excess of the standard bit-width size in an extended buffer.

11. A method according to claim 10 further comprising the step of:

monitoring the supplied instructions; and designating an instruction type of the monitored instructions.

12. A method according to claim 11 further comprising the steps of:

designating whether the allocated storage in the extended buffer for an instruction of the second type; and determining whether an instruction of the second type is already allocated when the instruction supply is supplying a designated instruction of the second type.

13. A method according to claim 12 further comprising the steps of:

stalling the supply of instructions when an instruction of the second type is already allocated and the instruction supplying step is supplying a designated instruction of the second type.

14. A processor comprising:

means for supplying instructions from an instruction set including a plurality of first instruction type instructions that generate a result having a standard bit-width size and a second instruction type instruction that generates a result having a large bit-width size, the large bit-width size being larger than the standard bit-width size;

a plurality of execution units coupled to the supplying means, an execution unit including:

means for receiving the supplied instructions;

means for executing the received instructions; and means for generating results of the executed instructions, the results being results of the standard bit-width size and results of the large bit-width size; and a reorder buffer coupled to the supplying means and coupled to the plurality of execution units, the reorder buffer including:

means for allocating storage for the supplied instructions;

means for receiving results of the executed instructions from the plurality of execution units;

a plurality of storage elements in a FIFO reorder buffer queue;

means for storing results of the standard bit-width size and for storing a subset of bits of the result of the large bit-width size; and an extended buffer; and means for storing a subset of bits of the result of the large bit-width size in excess of the standard bit-width size.

15. A processor according to claim 14 wherein the instruction supplying means further comprises:

means for monitoring the supplied instructions; and means for designating an instruction type of the supplied instructions.

16. A processor according to claim 15 wherein:

the reorder buffer is coupled to the instruction supplying means to receive the designated instruction type, the reorder buffer further including:

means for designating whether the reorder buffer has allocated storage in the extended buffer for an instruction of the second type; and means for determining whether an instruction of the second type is already allocated when the instruction supplying means is supplying a designated instruction of the second type.

17. A processor according to claim 16 further comprising:

a status line coupling the reorder buffer to the instruction supplying means, the status line for informing the instruction supply that an instruction of the second type is already allocated when the instruction supply is supplying a designated instruction of the second type, the instruction supplying means further including:

means for stalling the instruction supplying means responsive to an informing signal of the status line.

18. A processor according to claim 17 further comprising:

an execution unit for executing instructions of the second type, the execution unit for generating a result and valid signal indicative of a valid result of an instruction of the second type;

the reorder buffer further including:

a valid status bit for designating whether the reorder buffer has a valid result of an instruction of the second type in the allocated storage in the extended buffer.

19. A processor according to claim 18 further comprising:

a valid status line coupling the reorder buffer to the instruction supply, the status line for informing the instruction supply that the extended buffer holds a valid result of an instruction of the second type, the instruction supplying means farther including:

means for activating the instruction supply responsive to an informing signal of the valid status line.

20. A processor according to claim 14 wherein:

the large bit-width size is 64 bits; and the standard bit-width size is 32 bits.

21. A processor according to claim 14 wherein:

an execution unit of the plurality of execution units is a branch instruction unit;

a CALL instruction is an instruction of the second instruction type that is executed by the branch instruction unit and that generates a result having a large bit-width size, the bits of the large bit-width size in excess of the standard bit-width size being a branch target designation.

22. A processor according to claim 14 wherein:

an execution unit of the plurality of execution units is a branch instruction unit;

a JMPFDEC instruction is an instruction of the second instruction type that is executed by the branch instruction unit and that generates a result having a large bit-width size, the bits of the large bit-width size in excess of the standard bit-width size being a branch target designation.

* * * * *